Figure 2:
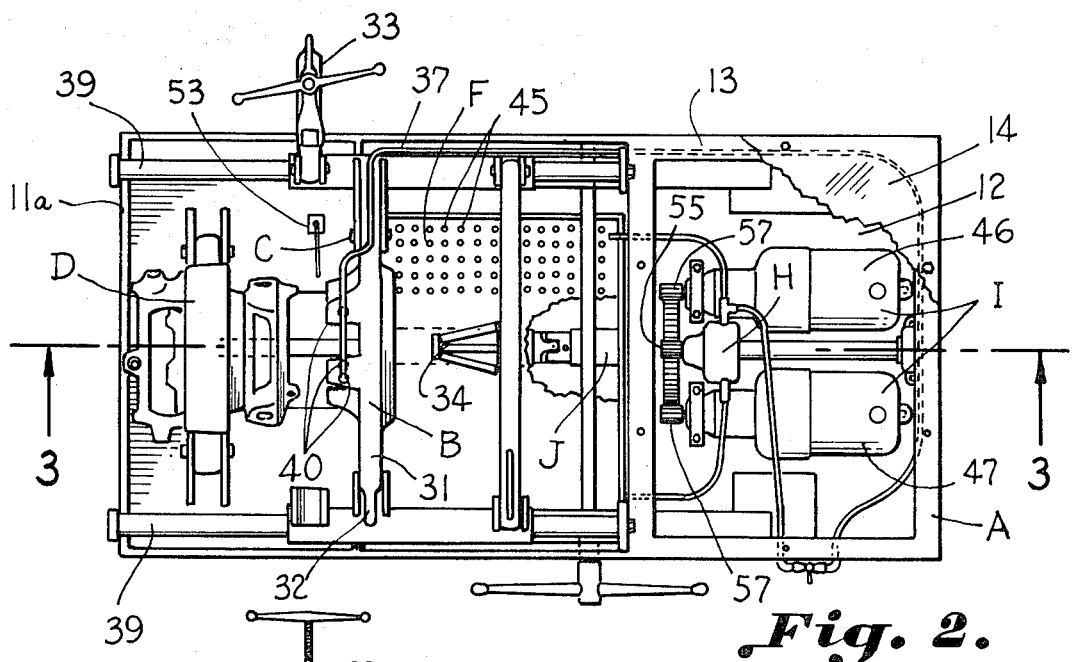

United States Patent

[11] 3,631,552

[72] Inventor Joe A. Ivester
62 Rock Creek Drive, Greenville, S.C. 29601
[21] Appl. No. 870,455
[22] Filed Oct. 17, 1969
[45] Patented Jan. 4, 1972

[54] PIPE WORKING TOOL ASSEMBLY
2 Claims, 5 Drawing Figs.

[52] U.S. Cl. .................................................. 10/89, 10/107
[51] Int. Cl. .................................................. B23g 1/00, B23g 1/22, B23g 1/24
[50] Field of Search .................................................. 10/89, 89 P, 87, 105, 106, 107; 82/2, 2.5

[56] References Cited
UNITED STATES PATENTS

| | | | |
|---|---|---|---|
| 1,852,186 | 4/1932 | Nonneman .................. | 10/89 |
| 2,614,435 | 10/1952 | Chasar ........................ | 10/106 |
| 2,692,996 | 11/1954 | Wallace ....................... | 10/106 |
| 2,709,822 | 6/1955 | Marsden ..................... | 10/106 |
| 2,768,550 | 10/1956 | Ingwer et al. ................ | 10/106 |
| 2,887,886 | 5/1959 | Chasar et al. ............... | 10/89 |
| 2,916,749 | 12/1959 | Ingwer et al. ................ | 10/106 |
| 3,274,627 | 9/1966 | Behnke ........................ | 10/106 |

Primary Examiner—Charles W. Lanham
Assistant Examiner—E. M. Combs
Attorney—Bailey and Dority ABSTRACT: A portable power tool assembly for pipe working and the like, has a longitudinal driving means drivingly engaged on one end thereof by a power driven longitudinally aligned assembly having a pair of aligned motors, a spaced longitudinally aligned chuck assembly driven on the other end of the longitudinal driving means, said chuck assembly including a pair of spaced aligned chucks and a gear therebetween, a movable housing carrying a longitudinally aligned cutting die assembly, said power driven assembly being carried on one side of the cutting die assembly and the chuck assembly being carried on the other side, and means discharging oil upon the dies through the die housing, so that a unitary power tool assembly is longitudinally driven to minimize size and enhance the range of its usefulness.

INVENTOR.
JOE A. IVESTER
BY
ATTORNEYS.

INVENTOR.
JOE A. IVESTER
BY
ATTORNEYS.

PIPE WORKING TOOL ASSEMBLY

This invention relates to a portable power tool assembly for working pipes and the like, providing a die head assembly and the like, with a pair of motors carried on one side thereof driving a chuck assembly carried on the other side for conserving space and facilitating portability.

Pipe and bolt threading devices have been formerly provided in the form of self-contained assemblies suitable for accommodating relatively small pipes and bolts and the like. Devices, such as die head assemblies, have been provided for accommodating larger workpieces, but such have not been provided with conveniently positioned driving or mounting means. It has formerly been necessary to mount such die heads, such as upon three-stand vices, and to employ a driving connection including a universal joint for connecting same to a separate driving unit. It has also been necessary to place a separate oil pan to collect oil, discharged from a separate means upon the workpiece and cutting dies, when employing such die heads.

This is an improvement upon the invention of my U.S. Pat. No. 3,332,095 upon which a reissue application bearing Ser. No. 848,760 was filed July 15, 1969, now U.S. Pat. No. Re 27,127, which discloses a device solving some of these problems.

An important object of this invention is to provide an improved portable power tool assembly capable of working upon workpieces of a variety of sizes.

Another object of the invention is to provide improved means discharging oil upon the workpiece during a cutting operation, reducing wear on the cutting parts, as well as reducing power requirements of the entire assembly.

Another very important object of the invention is the provision of a movable die head with improved direct driving means from a power driven assembly in alignment therewith.

Other important objects of the invention include the provision of means lubricating the workpiece through the die housing, and an improved double chuck assembly.

The invention contemplates an improved power driven assembly including two aligned motors for driving a double chuck assembly, with a die assembly positioned intermediate the power driven assembly and chuck assembly with means lubricating the dies through their housing member.

The construction designed to carry out the invention will be hereinafter described, together with other features thereof.

Figure 1:
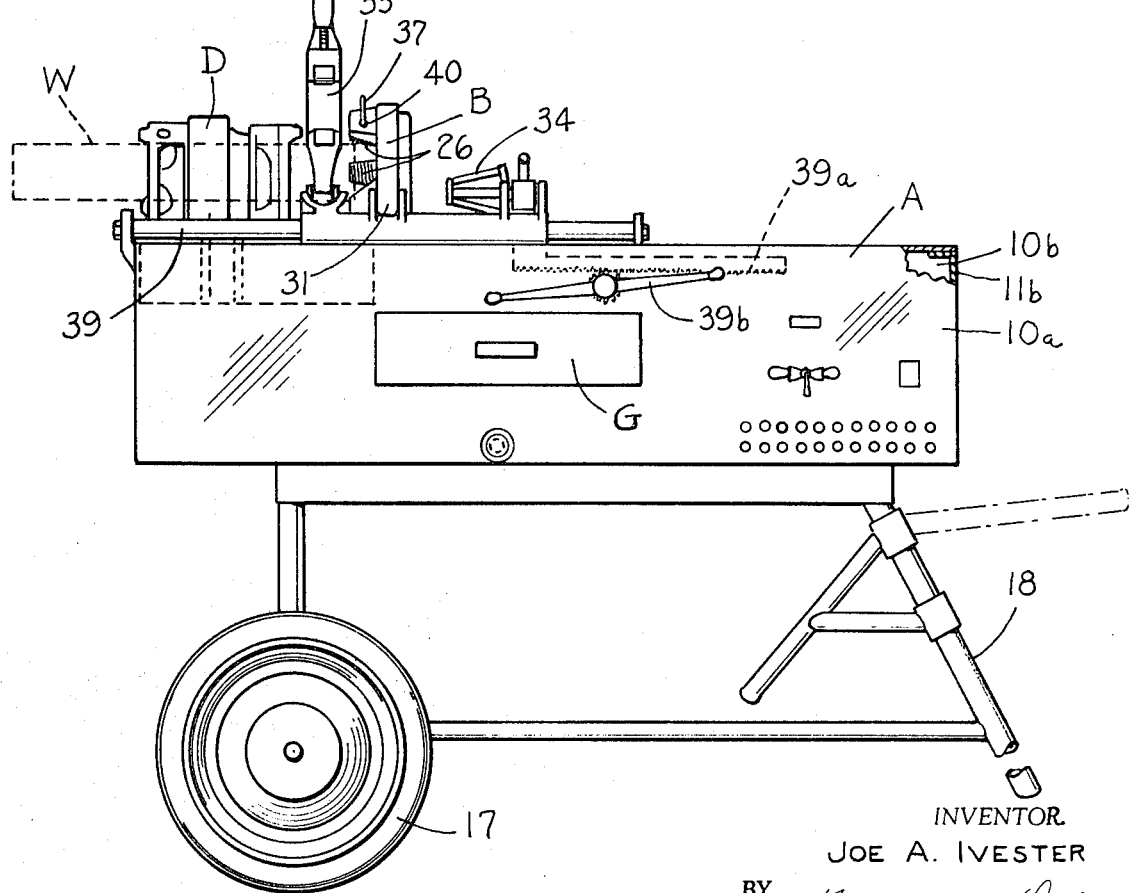
Figure 3:
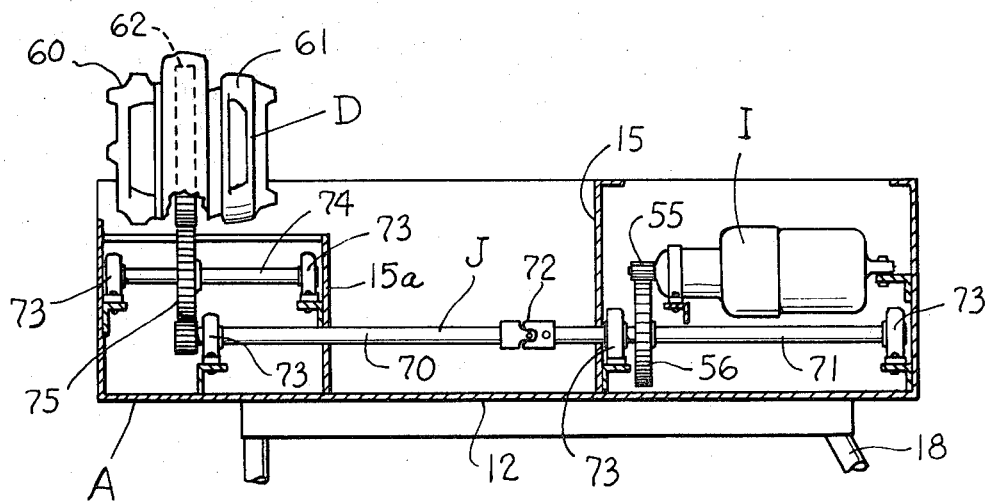
Figure 4:
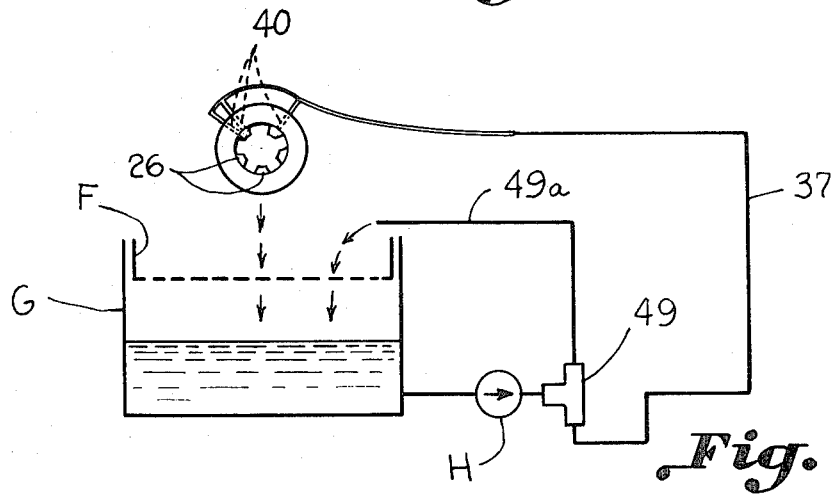
Figure 5:
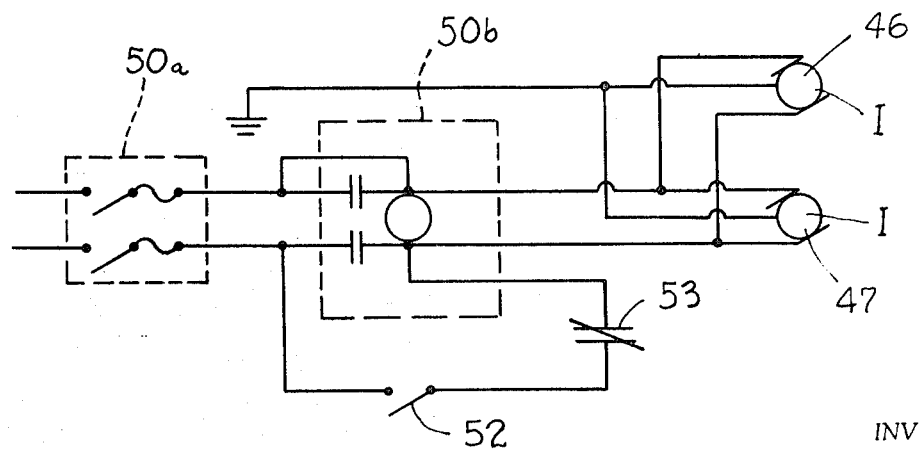

The invention will be more readily understood from a reading of the following specification and by reference to the accompanying drawings forming a part thereof, wherein an example of the invention is shown and wherein:

FIG. 1 is a side elevation illustrating a pipe working tool assembly constructed in accordance with the invention, FIG. 2 is a top plan view further illustrating the assembly, FIG. 3 is a longitudinal sectional elevation taken on the line 3—3 in FIG. 2, FIG. 4 is a diagrammatic illustration of the hydraulic components utilized in the assembly, and FIG. 5 is a diagrammatic illustration of the electrical components utilized in the assembly.

The drawings illustrate a portable power tool assembly for pipe working and the like, having a platform A carrying a housing B. The housing B has a longitudinal pivotal mounting C (FIG. 2) carried by the platform adjacent the rear of the housing. A chuck assembly D is carried by the platform A. The assembly D has a pair of spaced aligned chucks, and a gear for driving same positioned therebetween. Means E includes a housing having a passageway therein, conducting lubricant to the workpiece closely adjacent the dies. A flexible line carries oil and the like to passageways for delivery to the die and workpiece. An oil pan F is carried by the platform in fixed relation thereto beneath the housing for collecting oil discharged upon the dies and pipe. A reservoir G receives oil from the oil pan and a pump means H feeds oil from the reservoir to the passageway E. A power driven longitudinally spaced aligned assembly I constitutes a driving means having a pair of motors carried by said platform. A drive shaft J constitutes a longitudinal driving means and has means connecting it to the power driven assembly. The housing B carries a longitudinally aligned cutting die assembly on the platform between the chuck assembly D and the power driven assembly I. Gear means couple the power driven assembly I and the chuck assembly D to the drive shaft J adjacent respective ends thereof.

The platform A includes front and rear sides 10a and 10b, respectively, and end members 11a and 11b and a bottom portion 12. The platform has an outwardly extending edge portion 13 extending entirely thereabout, and is partially covered by a sheet metal portion 14. The platform has transversely spaced supporting wheels 17 and a pair of legs 18 extending outwardly so as to form a suitable base support.

A die head or cutting die assembly includes the housing B which has the pivotal mounting C (FIG. 2). The die head is supported upon the leg 31 when in operable or forward position for pipe threading, and has a handle 32 for raising the housing B transversely to an inoperable or rearward position, as when using another cutting die, such as carried by the usual cutting assembly 33 or the reamer 34. A suitable die head is illustrated as a Quadra-Type 2½ to 4 inch by Toledo-Beaver Tools Company, Division of Curtis Mfg., Co., P. O. Box 1689, Toledo, Ohio 43603.

Means E is provided for discharging oil and the like upon the threading dies 26 and the workpiece W, shown in broken lines in FIG. 1, as for example, during a thread cutting operation for lubricating and carrying away metal cuttings. The means E includes an elongated flexible tube 37 and passageways 40. The housing B which carries the threading dies 26 of the cutting die assembly adjacent the inner periphery thereof, has passageways 40 (FIGS. 2 and 4) therein for carrying oil for discharge upon the dies and workpiece closely adjacent the dies. The tubular member 37 may also be so positioned rearwardly into a retired or inoperable position. The passageways 40 originate adjacent the outer periphery of the housing B and terminate closely adjacent the dies on the inner periphery of the housing B. As shown in FIGS. 2 and 4, the passageways 40 extend radially in a transverse plane.

An oil pan F is carried by the platform A beneath the housing B, when in forward or operating position, for collecting oil discharged upon the dies 26 and pipe workpiece W as during a thread cutting operation. A reservoir G receives oil from the oil pan F through apertures 45 therein. A pump H is driven by gears 55 (FIGS. 2 and 3).

The housing B, the cutting assembly 33, and the reamer are mounted upon the platform A upon a movable frame 38, which is carried upon the spaced bars 39, and moved by the rack and pinion arrangements 39a by turning the handle 39b.

The operation of the electrical and hydraulic components might best be understood by reference to FIGS. 4 and 5. A source of electric power (preferably 115v.) is provided for the operation of transversely aligned motors 46 and 47 of the assembly I, which operates through suitable gearing 55 to operate the pump H. The motors are preferably 115v. drill-type (plug-in) and have suitable mounting upon the platform A in a portion separated by the partition 15. The partition 15a supports the reservoir G. The pump H pumps oil through a suitable selector valve 49 to the means E through the line 37. Since the pump H does not stop so long as the motors are running, it is important that the oil be permitted to flow at all times. The valve 49 is manually operable permitting oil to flow through the line 49a as when the housing B is in raised or retired position. The motors 46 and 47 and hence, the pump H may be controlled through the switch 52. It will be observed that a normally closed limit switch 53 is provided to prevent damage as may result should the housing B be moved to close the chuck assembly D. A two-pole circuit breaker and two-pole contactor are indicated at 50a and 50b.

The chuck assembly D includes a pair of spaced aligned chucks 60 and 61, and a gear 62 therebetween. As illustrated, the chuck 60 with integral gear 62 is a No. 141 chuck assembly. The chuck 61 is the same assembly with its gear removed and turned 180° and integrally joined as by welding to the first mentioned gear 62. It is important that the chuck assembly D be thus capable of supporting a workpiece at two points and be driven therebetween.

A drive shaft J has gear means 56 connecting it to the power take-off gears 57 of the assembly I. The drive shaft J has portions 70 and 71 joined by a shear coupling 72. The shaft has bearings 73. An auxiliary shaft portion 74 carries a gear 75 for driving the gear 62 of the chuck assembly D. The shaft J is carried beneath the horizontal plane of the motors as illustrated.

While a preferred embodiment of the invention has been described using specific terms, such description is for illustrative purposes only, and it is to be understood that changes and variations may be made without departing from the spirit or scope of the following claims:

What is claimed is:

1. A portable power tool assembly for pipe working and the like comprising, in combination: a platform; a double chuck assembly carried by said platform above an upper surface of the platform; a power driving assembly carried by said platform below said upper surface of the platform in longitudinal alignment with and spaced from said chuck assembly; a drive shaft; means connecting said power driving assembly to said shaft, said driving assembly including a pair of motors transversely aligned in substantially the same horizontal plane, said drive shaft being longitudinally aligned between and positioned beneath said motors; means connecting said drive shaft to said chuck assembly for driving said chuck assembly; a cutting die assembly carried by said platform in longitudinal and vertical alignment between said chuck assembly and said power driving assembly; said cutting die assembly including a housing; means carrying said housing for moving said housing transversely forwardly and rearwardly on said platform; and longitudinal support means carrying said housing for moving said housing longitudinally on said platform.

2. The power-connected tool assembly set forth in claim 1, wherein said chuck assembly comprises a pair of longitudinally spaced and aligned chucks each fixedly connected directly to a driving gear positioned therebetween.

* * * * *